US012087490B2

(12) United States Patent
Okuizumi et al.

(10) Patent No.: US 12,087,490 B2
(45) Date of Patent: Sep. 10, 2024

(54) INDUCTOR

(71) Applicant: Murata Manufacturing Co., Ltd., Kyoto-fu (JP)

(72) Inventors: Hiroshi Okuizumi, Nagaokakyo (JP); Yuuki Nagata, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 831 days.

(21) Appl. No.: 17/149,323

(22) Filed: Jan. 14, 2021

(65) Prior Publication Data

US 2021/0217552 A1 Jul. 15, 2021

(30) Foreign Application Priority Data

Jan. 15, 2020 (JP) ................................ 2020-004553
Jun. 3, 2020 (JP) ................................ 2020-096808

(51) Int. Cl.

| | |
|---|---|
| ***H01F 17/04*** | (2006.01) |
| ***H01F 27/28*** | (2006.01) |
| ***H01F 27/29*** | (2006.01) |
| ***H01F 27/32*** | (2006.01) |
| ***H01F 41/04*** | (2006.01) |

(52) U.S. Cl.

CPC ......... *H01F 27/2804* (2013.01); *H01F 27/29* (2013.01); *H01F 27/321* (2013.01); *H01F 41/041* (2013.01); *H01F 2027/2809* (2013.01)

(58) Field of Classification Search

CPC .................................................. H01F 27/2804
USPC .......................................................... 336/192
See application file for complete search history.

(56) References Cited

U.S. PATENT DOCUMENTS

2004/0076842 A1* 4/2004 Ishigaki .................. C23C 24/08 106/287.19
2011/0242775 A1 10/2011 Schaible et al.
2012/0105187 A1 5/2012 Lin
2015/0035634 A1* 2/2015 Nakamura ............ H01F 41/046 336/170
2016/0012962 A1 1/2016 Lee et al.
(Continued)

FOREIGN PATENT DOCUMENTS

JP 2009-123927 A 6/2009
JP 2013-098282 A 5/2013
(Continued)

*Primary Examiner* — Ronald Hinson
(74) *Attorney, Agent, or Firm* — Studebaker & Brackett PC

(57) ABSTRACT

An inductor includes a coil including a winding section and extended sections, a body containing the coil and having a bottom surface and end surfaces adjacent to the bottom surface and opposed to each other, and outer electrodes on at least the bottom surface and connected to the extended sections. The winding-axis direction of the coil intersects with the bottom surface. The conductor has a cross section with a rectangular shape defined by thickness and width and has first surfaces defined by its extending direction and the thickness direction and second surfaces defined by the extending direction and the width direction. The winding section is spirally wound such that the second surfaces are on an outer side and on an inner side, respectively, and is wound in two tiers connected in their innermost locations, and both ends are in outermost locations in the tiers, respectively.

12 Claims, 4 Drawing Sheets

(56) References Cited

U.S. PATENT DOCUMENTS

| | | | | |
|---|---|---|---|---|
| 2016/0155550 | A1* | 6/2016 | Ohkubo | H01F 1/24<br>336/233 |
| 2019/0244745 | A1* | 8/2019 | Kojima | H01F 27/255 |
| 2020/0294709 | A1* | 9/2020 | Kim | H01F 27/292 |

FOREIGN PATENT DOCUMENTS

| | | | |
|---|---|---|---|
| JP | 2013-149814 | A | 8/2013 |
| JP | 2015-002228 | A | 1/2015 |
| JP | 2017-120809 | A | 7/2017 |
| JP | 2018-182206 | A | 11/2018 |
| JP | 2019-125689 | A | 7/2019 |
| JP | 2019-197781 | A | 11/2019 |

* cited by examiner

INDUCTOR

CROSS-REFERENCE TO RELATED APPLICATIONS

This application claims benefit of priority to Japanese Patent Application No. 2020-096808, filed Jun. 3, 2020, and to Japanese Patent Application No. 2020-004553, filed Jan. 15, 2020, the entire contents of which are incorporated herein by reference.

BACKGROUND

Technical Field

The present disclosure relates to an inductor.

Background Art

An electronic component in which both ends of a coil formed by winding a conducting wire having a rectangular cross section around a T core made of a resin and magnetic powder are folded back at end portions of the T core, are extended toward the bottom surface side, and are connected to outer electrodes on the bottom surface is described in U.S. Patent Application Publication No. 2016/0012962.

SUMMARY

In manufacture of the electronic component described in the above-described U.S. Patent Application Publication No. 2016/0012962, it is necessary to twist the conducting wire with the rectangular cross section 90 degrees midway and then fold the conducting wire back at the end portions of the T core in order to fold back both ends of the coil toward the bottom surface side and extend them. Therefore, a manufacturing process for twisting the conducting wire is needed, and a problem arises in improvement of the productivity. In addition, because the T core has a certain degree of thickness, there is another problem that a further reduction in profile is difficult. Accordingly, the present disclosure provides an inductor that can be produced in a simplified process.

According to preferred embodiments of the present disclosure, an inductor includes a coil including a winding section formed of a wound conductor and a pair of extended sections extended from the winding section, a body containing the coil, formed of a magnetic portion including magnetic powder and a resin, and having a bottom surface and end surfaces adjacent to the bottom surface and opposed to each other, and a pair of outer electrodes arranged on at least the bottom surface of the body and electrically connected to the pair of extended sections, respectively. The coil is arranged such that a winding-axis direction of the winding section intersects with the bottom surface of the body. A cross section of the conductor perpendicular to an extending direction thereof has a rectangular shape defined by a thickness and a width, the conductor has a pair of first surfaces defined by the extending direction and a thickness direction and a pair of second surfaces defined by the extending direction and a width direction. In the winding section, the conductor is spirally wound such that a first one of the second surfaces is on an outer side and a second one of the second surfaces is on an inner side, the conductor is wound in two tiers connected in their innermost locations, and both ends of the conductor are in outermost locations in the tiers, respectively, of the winding section. The extended sections are extended in a direction of the bottom surface such that the second surfaces are parallel with the winding-axis direction. A first one of the first surfaces of leading end portions in the extended sections is connected to the outer electrodes at the bottom surface of the body.

According to the aspect of the present disclosure, the inductor capable of being produced in a simplified process can be provided.

Other features, elements, characteristics and advantages of the present disclosure will become more apparent from the following detailed description of preferred embodiments of the present disclosure with reference to the attached drawings.

DETAILED DESCRIPTION

Figure 1:
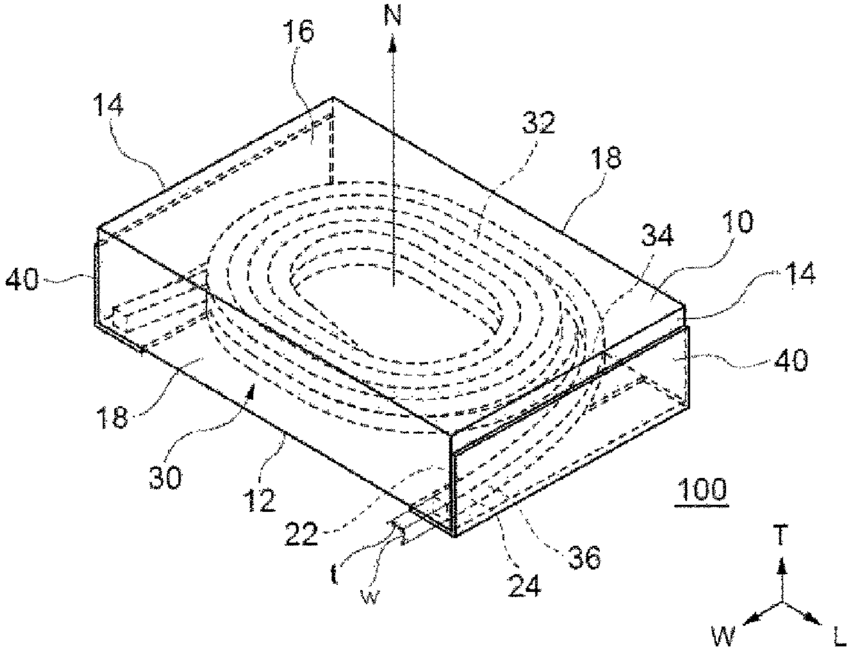
FIG. 1 is a partially transparent perspective view of an inductor according to a first embodiment as seen from an upper surface side.

An inductor includes a coil including a winding section formed of a wound conductor and a pair of extended sections extended from the winding section, a body containing the coil, formed of a magnetic portion including magnetic powder and a resin, and having a bottom surface and end surfaces adjacent to the bottom surface and opposed to each other, and a pair of outer electrodes arranged on at least the bottom surface of the body and electrically connected to the pair of extended sections, respectively. The coil is arranged such that a winding-axis direction of the winding section intersects with the bottom surface of the body. A cross section of the conductor perpendicular to an extending direction thereof has an approximately rectangular shape defined by a thickness and a width, the conductor has a pair of first surfaces defined by the extending direction and a thickness direction and a pair of second surfaces defined by the extending direction and a width direction. In the winding section, the conductor is spirally wound such that a first one of the second surfaces is on an outer side and a second one of the second surfaces is on an inner side, the conductor is wound in two tiers connected in their innermost locations, and both ends of the conductor are in outermost locations in the tiers, respectively, of the winding section. The extended sections are extended in a direction of the bottom surface such that the second surfaces are approximately parallel with the winding-axis direction. A first one of the first surfaces of leading end portions in the extended sections is connected to the outer electrodes at the bottom surface of the body.

When the extended sections in the coil are extended in the direction of the bottom surface such that the second surfaces of the conductor are approximately parallel with the winding-axis direction of the coil and the first one of the first surfaces is approximately flush with the bottom surface, part of the leading end portions in the conductor can be connected to the outer electrodes without a twist of the conductor. The unnecessity of folding the conductor back can facilitate reduction in the profile of the inductor.

In the above-described inductor, the first one of the second surfaces of the leading end portions in the extended sections may be connected to the outer electrodes at the end surfaces of the body, and the outer electrodes may extend from the bottom surface to the end surfaces. When the first one of the first surfaces of the conductor is approximately flush with the bottom surface of the body and the first one of the second surfaces, which is on the outer side, of the conductor is approximately flush with the end surfaces of the body and is connected to the outer electrode extending from the bottom surface to the end surfaces, the area where the conductor and the outer electrodes are connected is increased, the direct-current resistance of the inductor is reduced, and the strength of fixing to a substrate when it is mounted is improved.

The coil may include a region where the thickness of the conductor in the leading end portions in the extended sections is larger than the thickness of the conductor in the winding section and the width of the conductor in the leading end portions in the extended sections is smaller than the width of the conductor in the winding section. When each of the leading end portions in the extended sections has the region where the first surfaces of the conductor are larger and that region is approximately flush with the bottom surface of the body, the area where the conductor and the outer electrodes are connected is increased, and the direct-current resistance of the inductor is reduced.

The term "process" in the present specification includes not only an independent process but a process whose intended purpose is accomplished even if it is not distinguishable from another process. Embodiments of the present disclosure are described below on the basis of the drawings. The embodiments illustrated below are illustrative of an inductor for embodying a technical idea of the present disclosure, and the present disclosure is not limited to the inductor illustrated below. Members illustrated in the claims are never limited to members in the embodiments. In particular, dimensions, materials, shapes, relative arrangements, and the like described in the embodiments are not intended to limit the scope of the present disclosure thereto and are merely examples for explanation, unless otherwise specified. In the drawings, the same reference numerals are used in the same places. Although the embodiments are separately illustrated for the sake of convenience in consideration of description of main points or ease of understanding, the configurations illustrated in different embodiments can be replaced or combined in part. In second and subsequent embodiments, description of items common to a first embodiment is omitted, and only different points are described. In particular, similar operational advantages from similar configurations are not individually mentioned for each embodiment.

EMBODIMENTS

The present disclosure is described below by using embodiments, to which the present disclosure is not limited.

First Embodiment

Figure 2:
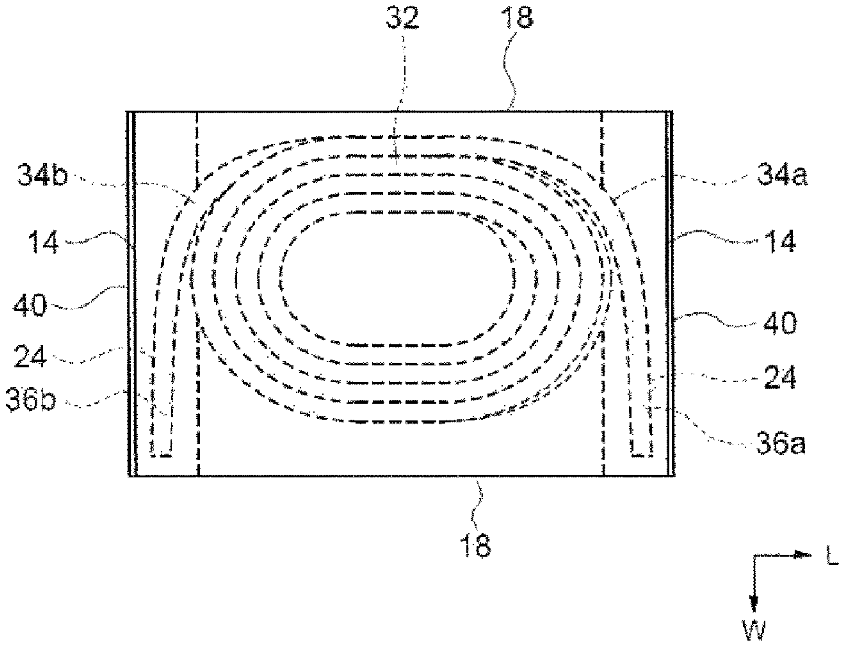
FIG. 2 is a partially transparent plan view of the inductor according to the first embodiment as seen from the upper surface side.
Figure 3:
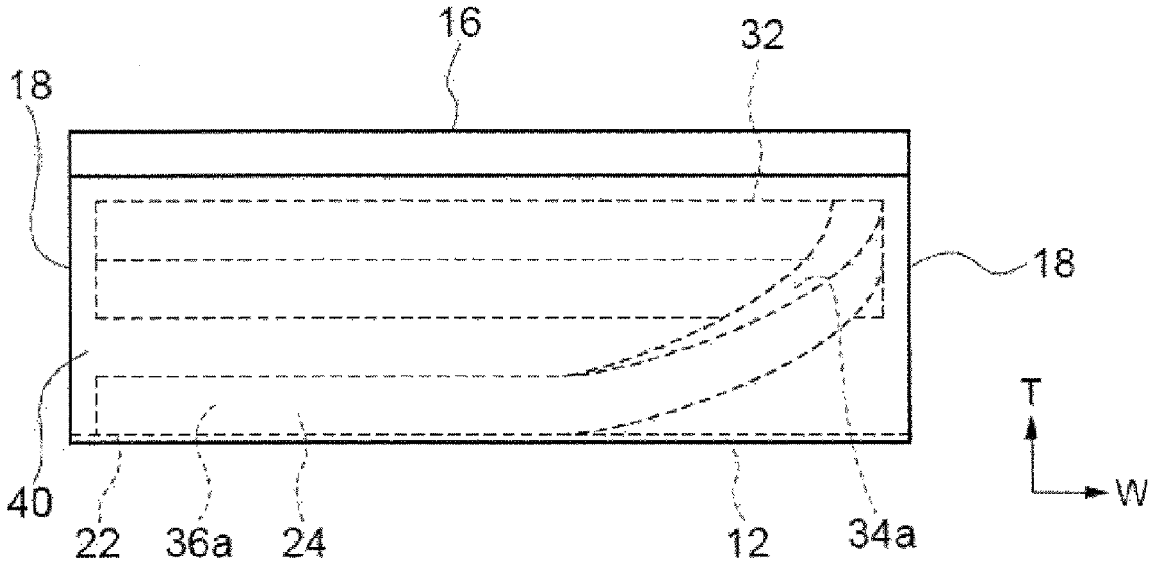
FIG. 3 is a partially transparent plan view of the inductor according to the first embodiment as seen from an end surface side.

An inductor according to a first embodiment is described with reference to FIGS. 1 to 3. FIG. 1 is a partially transparent perspective view of an inductor 100 as seen from an upper surface side. FIG. 2 is a partially transparent plan view of the inductor 100 as seen from the upper surface side. FIG. 3 is a partially transparent plan view of the inductor 100 as seen from an end surface side.

As illustrated in FIG. 1, the inductor 100 includes a coil 30 including a winding section 32 in which a conductor is wound around a winding axis N and a pair of extended sections 34 extended from the winding section 32, a body 10 containing the coil 30 and made of a magnetic portion including magnetic powder and a resin, and a pair of outer electrodes 40 extending from a bottom surface 12 to end surfaces 14 of the body 10 and electrically connected to leading end portions 36 of the extended sections 34, respectively, of the coil 30 at the bottom surface 12. The body 10 has the bottom surface 12, which is positioned on a mounting surface side, an upper surface 16 opposed to the bottom surface 12 in a height direction (T direction), the two end surfaces 14 adjacent to and approximately perpendicular to the bottom surface 12 and opposed to each other in a length direction (L direction), and two side surfaces 18 adjacent to and approximately perpendicular to the bottom surface 12 and the end surfaces 14 and opposed to each other in a width direction (W direction).

Figure 6:
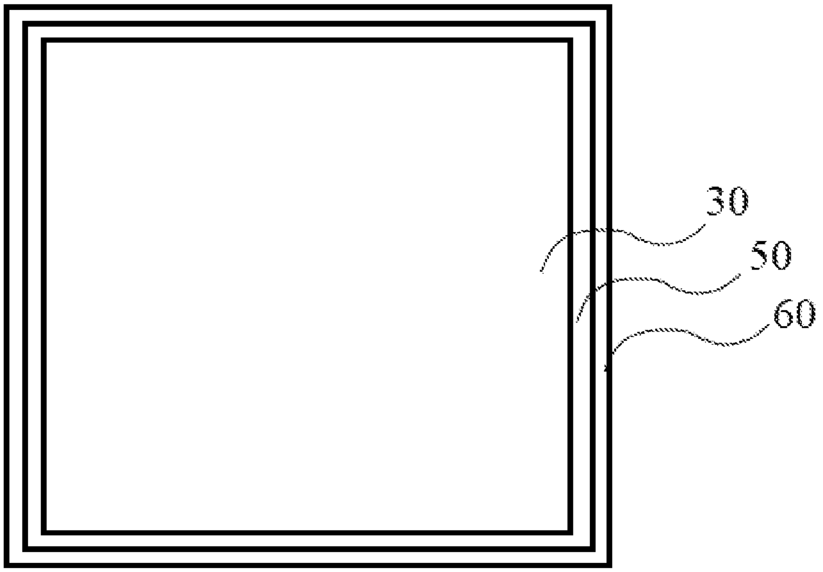
FIG. 6 is a sectional view of a coil having a covering layer and a fusion layer according to at least a first embodiment.

The conductor forming the coil 30 includes a covering layer 50 on its surface, its cross section substantially perpendicular to an extending direction of the conductor (length direction) has an approximately rectangular shape defined by a thickness t and a width w, and that shape may be approximately square. The conductor has a pair of first surfaces 22 defined by the extending direction of the conductor and the direction of thickness t and opposed to each other and a pair of second surfaces 24 defined by the extending direction and the direction of the width w and opposed to each other. One example of the thickness t of the conductor may be not less than about 0.2 mm and not more than about 1 mm (i.e., from about 0.2 mm to about 1 mm). One example of the width w of the conductor may be not less than about 0.2 mm and not more than about 1 mm (i.e., from about 0.2 mm to about 1 mm). One example aspect ratio (t/w) of the cross section of the conductor may be not less than about 1/1.3 and may preferably be approximately 1/1. The covering layer 50 in the conductor may be made of an insulating resin, such as polyimide or polyamide-imide, and may have a thickness of not less than about 2 μm and not more than about 10 μm (i.e., from about 2 μm to about 10 μm). To prevent loosening of the winding section, a fusion layer 60 including a self-fusing component, such as a thermoplastic resin or a thermosetting resin, may further be disposed on the surface of the covering layer 50, and its thickness may be not less than about 1 μm and not more than about 3 μm (i.e., from about 1 μm to about 3 μm). For example, see FIG. 6 showing the coil 30 including the covering layer 50 and the fusion layer 60.

In the winding section 32 in the coil 30, both ends of the conductor are in the outermost locations, the conductor is spirally wound such that a first one of the second surfaces 24 is on the outer side and a second one of the second surface 24 is on the inner side, and the conductor is wound in two tiers connected in their innermost locations such that one of the first surfaces 22 in one tier and that in the other tier face each other (so-called a winding). The coil 30 is contained in the body 10 such that the winding axis N of the winding section 32 intersects with the bottom surface 12 and the upper surface 16 of the body 10.

As illustrated in FIGS. 2 and 3, a leading end portion 36*a* in an extended section 34*a* is extended from the outermost location in the upper tier of the winding section 32, which is near the upper surface 16, toward a first one of the side surfaces 18 of the body 10. A leading end portion 36*b* in an extended section 34*b* is extended from the outermost location in the lower tier of the winding section 32, which is near the bottom surface 12, toward the first one of the side surfaces 18 of the body 10. The leading end portions 36*a* and 36*b* are extended such that the first one of the second surfaces 24, which is on the outer side, is spaced away from the end surfaces 14 of the body 10. The extended sections 34*a* and 34*b* are extended in the direction of the bottom surface of the body 10 such that the second surfaces 24 of the conductor are approximately parallel with the winding axis of the winding section 32. A first one of the first surfaces 22 of the conductor of the leading end portions 36*a* and 36*b* is approximately flush with the bottom surface 12, is exposed from the bottom surface 12 of the body 10, and is connected to the outer electrodes 40. That is, the conductor is extended in the direction of the bottom surface without being twisted in the extending direction. The first one of the first surfaces 22 exposed from the bottom surface 12 of the body 10 in the leading end portion 36*a* and that of the leading end portion 36*b* are electrically connected to the outer electrodes 40, respectively.

The aspect ratio (t/w) of the cross section of the conductor may be larger than about 1/1. In that case, the winding section is an edgewise winding, so-called alpha winding, coil. When such conducting wire is used, the conductor can be more easily extended to the bottom surface without being twisted.

The body 10 may have an approximately rectangular parallelepiped shape. Example dimensions of the body 10 are described below. The length L may be not less than about 1 mm and not more than about 3.4 mm (i.e., from about 1 mm to about 3.4 mm) and may preferably be not less than about 1 mm and not more than about 3 mm (i.e., from about 1 mm to about 3 mm); the width W may be not less than about 0.5 mm and not more than about 2.7 mm (i.e., from about 0.5 mm to about 2.7 mm) and may preferably be not less than about 0.5 mm and not more than about 2.5 mm (i.e., from about 0.5 mm to about 2.5 mm); and the height T may be not less than about 0.5 mm and not more than about 2 mm (i.e., from about 0.5 mm to about 2 mm) and may preferably be not less than about 0.5 mm and not more than about 1.5 mm (i.e., from about 0.5 mm to about 1.5 mm). Concrete examples of the size L×W×T of the body 10 may include about 1 mm×about 0.5 mm×about 0.5 mm, about 1.6 mm×about 0.8 mm×about 0.8 mm, about 2 mm×about 1.2 mm×about 1 mm, and about 2.5 mm×about 2 mm×about 1.2 mm.

The magnetic portion forming the body 10 is made of a composite material including magnetic powder and a binder, such as a resin. Examples of the magnetic powder may include iron-based metal magnetic powder, such as Fe, Fe—Si, Fe—Ni, Fe—Si—Cr, Fe—Si—Al, Fe—Ni—Al, Fe—Ni—Mo, and Fe—Cr—Al powder, other composition-based metal magnetic powder, metal magnetic powder such as an amorphous metal, metal magnetic powder having a surface coated with an insulator, such as glass, metal magnetic powder having a modified surface, and nanoscale fine metal magnetic powder. Examples of the resin used as one example of the binder may include a thermosetting resin, such as an epoxy resin, a polyimide resin, or a phenol resin, and a thermoplastic resin, such as a polyethylene resin, a polyamide resin, or a liquid polymer. One example filling factor of the magnetic powder in the composite material may be not less than about 50 percentage by mass and not more than about 85 percentage by mass (i.e., from about 50 percentage by mass to about 85 percentage by mass), may preferably be not less than about 60 percentage by mass and not more than about 85 percentage by mass (i.e., from about 60 percentage by mass to about 85 percentage by mass) or be not less than about 70 percentage by mass and not more than about 85 percentage by mass (i.e., from about 70 percentage by mass to about 85 percentage by mass).

A protective layer (not illustrated) may be arranged on the surface of the body 10. The protective layer may be arranged in a region other than a region where the outer electrodes are arranged on the surface of the body. One example of the protective layer may include a resin. Examples of the resin forming the protective layer may include a thermosetting resin, such as an epoxy resin, a polyimide resin, or a phenol resin, and a thermoplastic resin, such as an acrylic-based resin, a polyethylene resin, or a polyamide resin. The protective layer may include a filler. Example of the filler may include a non-conductive filler, such as a silicon oxide or a titanium oxide. One example of the protective layer can be formed by providing a resin composite including the resin and the filler to the surface of the body by means, such as coating or dipping and, as needed, solidifying the provided resin.

A marker (not illustrated) may be on the body 10. The marker may be on, for example, the upper surface 16 of the body 10 on the side where the extended section 34*b* is extended from the lower tier of the winding section 32, and it may indicate the polarity of the inductor. The marker may be formed by, for example, printing, laser engraving, or other methods.

In the inductor 100, each of the outer electrodes 40 extends from the bottom surface 12 to the end surface 14 of the body 10. The outer electrode 40 is electrically connected to the first surface 22 of the conductor at the leading end portion 36 in the extended section 34. The outer electrode 40 may be formed by, for example, plating. The outer electrode 40 formed by plating may include a first layer made of copper, a second layer made of nickel and disposed on the first layer, and a third layer made of tin and disposed on the second layer. The outer electrode 40 may be formed of a conductive layer formed by application of conductive paste. The conductive paste may include conductive particles, such as silver particles or copper particles, and a binding resin. The outer electrode 40 may further include a plating layer formed on the conductive layer.

One example of the inductor 100 can be formed by a manufacturing method including a coil forming process of forming a coil by forming a conductor into a desired shape, a body forming process of exposing one of first surfaces of a leading end portion in an extended section in the coil, placing it into a composite material including magnetic powder and a resin, pressuring it with a die or the like, and shaping it into a body, and an outer-electrode forming process of forming an outer electrode on a bottom surface in which the first surface is exposed.

Second Embodiment

Figure 4:
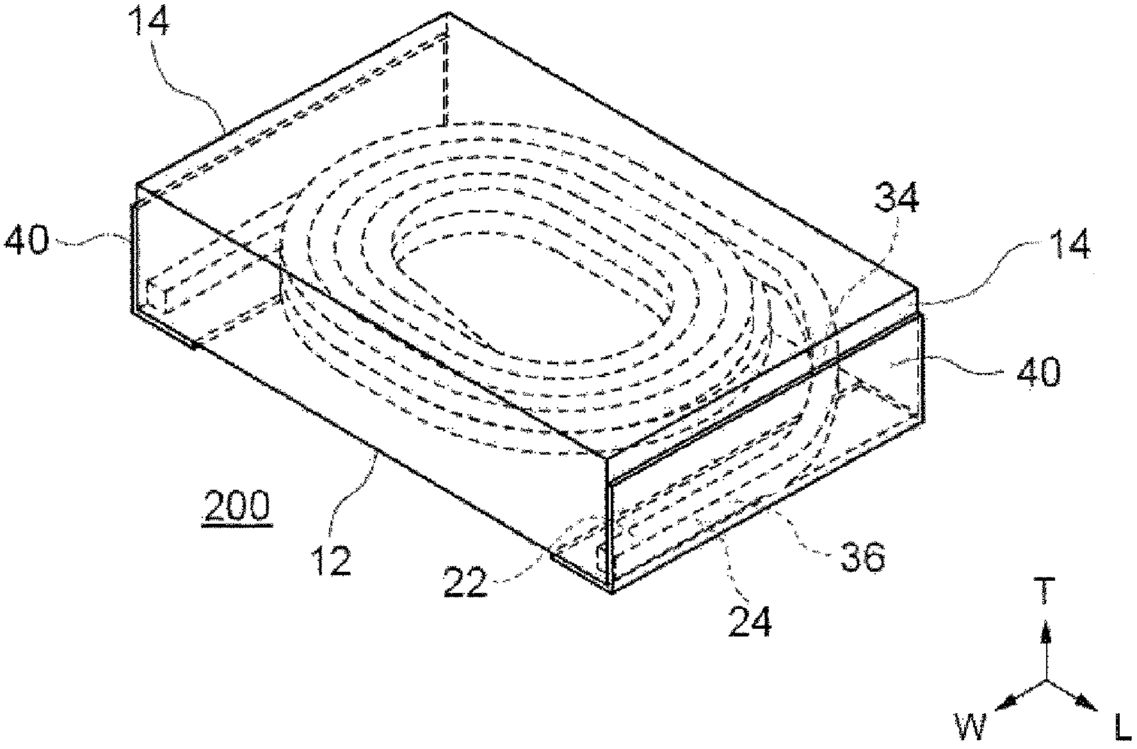
FIG. 4 is a partially transparent perspective view of an inductor according to a second embodiment as seen from an upper surface side.

An inductor according to a second embodiment is described with reference to FIG. 4. FIG. 4 is a partially transparent perspective view of an inductor 200 as seen from an upper surface side. The inductor 200 according to the second embodiment has substantially the same configuration as that of the inductor 100 according to the first embodiment, except that in the leading end portion 36 in each of the extended sections 34, one of the second surfaces 24 on the outer side of the conductor is approximately flush with the end surface 14 of the body 10 and is exposed from the end surface 14 of the body 10.

In the inductor 200, one of the first surfaces 22 of the conductor forming the coil in the leading end portion 36 in the extended section 34 is approximately flush with the bottom surface 12 of the body 10 and is exposed from the bottom surface 12 of the body 10. One of the second surfaces 24 of the conductor is approximately flush with the end surface 14 of the body and is exposed from the end surface 14 of the body 10. The outer electrode 40 is arranged on the surfaces of the conductor exposed from the body 10 and is electrically connected thereto.

In the inductor 200, because the two surfaces of the conductor are electrically connected to the outer electrode 40, the area where the conductor and the outer electrode 40 are connected is large, and the direct-current resistance as the inductor is reduced. The outer electrode 40 extends from the bottom surface 12 to the end surface 14 of the body 10 and has a substantially L shape as seen from the side-surface direction (W direction). Therefore, the strength of fixing to a substrate when the inductor is mounted can be improved.

Third Embodiment

Figure 5:
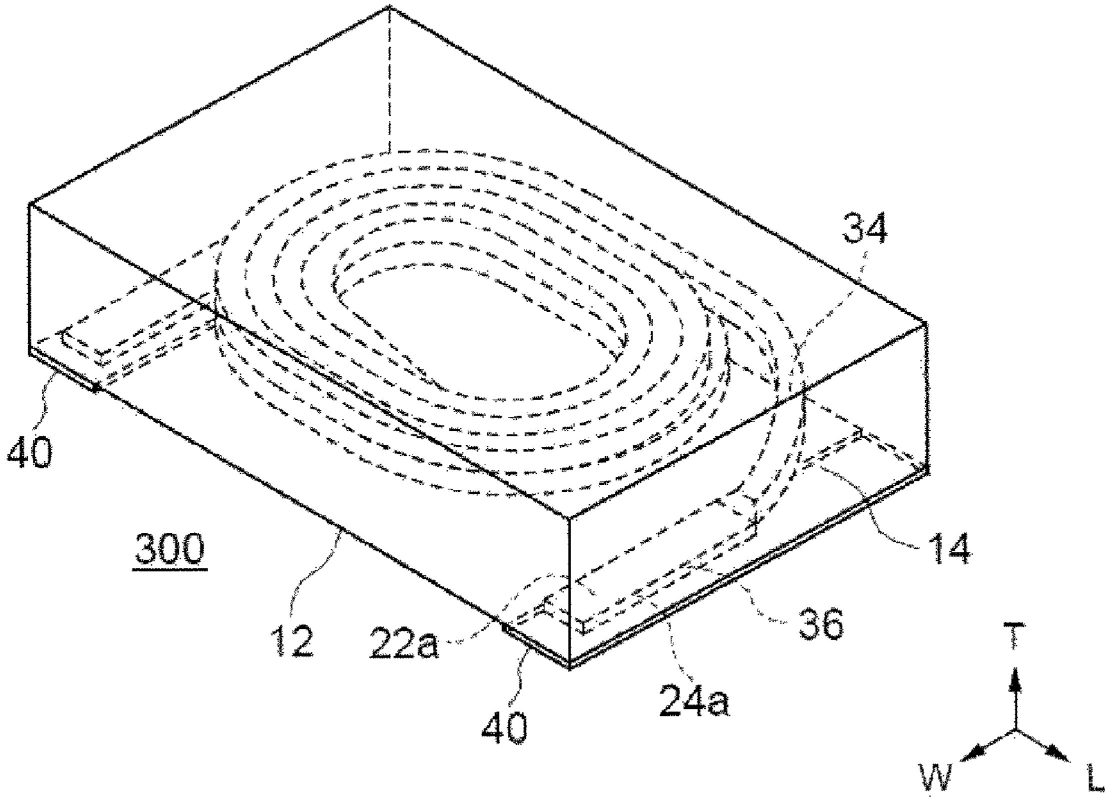
FIG. 5 is a partially transparent perspective view of an inductor according to a third embodiment as seen from an upper surface side.

An inductor according to a third embodiment is described with reference to FIG. 5. FIG. 5 is a partially transparent perspective view of an inductor 300 according to the third embodiment as seen from an upper surface side. The inductor 300 according to the third embodiment has a similar configuration to that of the inductor 100 according to the first embodiment, except that the leading end portion 36 in each of the extended sections 34 has a region where the thickness of the conductor is larger than that of the conductor in the winding section 32, the width of the conductor is smaller than that of the conductor in the winding section 32, and the outer electrodes 40 are arranged on only the bottom surface 12 of the body 10.

In the inductor 300, the conductor is compressed in the width direction and is widened in the thickness direction in the leading end portion 36 in the extended section 34. Thus, the thickness of the conductor in the leading end portion 36 is larger than that of the conductor in the winding section 32. In contrast, the width of the conductor in the leading end portion 36 is smaller than that of the conductor in the winding section 32. In FIG. 5, the region compressed in the width direction is present from the end portion of the conductor toward the extended section 34. One of first surfaces 22*a* widened in the thickness direction is approximately flush with the bottom surface 12 of the body 10 and is exposed from the bottom surface 12 of the body 10. The first surface 22*a* exposed from the bottom surface 12 of the body 10 is electrically connected to the outer electrode 40 on the bottom surface 12 of the body 10. One of second surfaces 24*a* compressed and having the reduced width is spaced away from the end surface 14 of the body 10.

In the inductor 300, the area where the outer electrode 40 and the leading end portion 36 of the conductor are connected can be increased, and the direct-current resistance as the inductor can be reduced.

The above-described inductors are examples in the cases where the outer electrodes extend from the bottom surface to the end surfaces of the body. The outer electrodes may also be disposed on at least one of the upper surface and the side surfaces. The end surface in the extending direction of the conductor may be approximately flush with the side surface of the body and be exposed from the side surface of the body. The cross section substantially perpendicular to the extending direction of the conductor is not limited to the substantially rectangular shape described above, and may have a shape in which its corners are chamfered, a shape in which its sides has curves, such as substantially semicircular or substantially semielliptical curves, or other shapes. The shape of the winding section in the coil as seen from the winding-axis direction may be other than substantially oblong, and examples of the other shapes may include a substantially circle, a substantially ellipse, and a substantially polygon with chamfered edges. The resin composition including the filler and the resin and forming the protective layer may be replaced with an inorganic material, such as water glass. A recessed portion (standoff portion) may be disposed in a region where no outer electrodes are arranged of the bottom surface of the body. The recessed portion in the bottom surface of the body may have a substantially semicircular shape in the height T direction as seen from the width W direction.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An inductor comprising:

a coil including a winding section in which an conductor is wound and a pair of extended sections extended from the winding section;

a body containing the coil, the body including a magnetic portion including magnetic powder and a resin, and having a bottom surface and end surfaces adjacent to the bottom surface and opposed to each other; and a pair of outer electrodes arranged on at least the bottom surface of the body and electrically connected to the pair of extended sections, respectively, wherein the coil is arranged such that a winding-axis direction of the winding section intersects with the bottom surface of the body, a cross section of the conductor perpendicular to an extending direction thereof has a rectangular shape defined by a thickness and a width, the conductor has a pair of first surfaces defined by the extending direction and a thickness direction and a pair of second surfaces defined by the extending direction and a width direction, in the winding section, the conductor is spirally wound such that a first one of the second surfaces is on an outer side and a second one of the second surfaces is on an inner side, the conductor is wound in two tiers connected in their innermost locations, and both ends of the conductor are located outermost of the winding section in the respective tiers, the extended sections are extended in a direction of the bottom surface such that the second surfaces are parallel with the winding-axis direction, and a first one of the first surfaces of leading end portions in the extended sections is connected to the outer electrodes at the bottom surface of the body, and the first surfaces and the second surfaces have a same orientation in the winding section and in the leading end portions.

2. The inductor according to claim 1, wherein the coil includes a region where the thickness of the conductor in the leading end portions in the extended sections is larger than the thickness of the conductor in the winding section, and the width of the conductor in the leading end portions in the extended sections is smaller than the width of the conductor in the winding section.

3. The inductor according to claim 1, wherein the thickness of the conductor is from 0.2 mm to 1 mm.

4. The inductor according to claim 1, wherein the width of the conductor is from 0.2 mm to 1 mm.

5. The inductor according to claim 1, wherein the first one of the second surfaces of the leading end portions in the extended sections is connected to the outer electrodes at the end surfaces of the body, and the outer electrodes extend from the bottom surface to the end surfaces.

6. The inductor according to claim 5, wherein the coil includes a region where the thickness of the conductor in the leading end portions in the extended sections is larger than the thickness of the conductor in the winding section, and the width of the conductor in the leading end portions in the extended sections is smaller than the width of the conductor in the winding section.

7. The inductor according to claim 1, wherein the conductor includes a covering layer thereon.

8. The inductor according to claim 7, wherein the covering layer includes an insulating resin.

9. The inductor according to claim 7, wherein the covering layer has a thickness of 2 μm to 10 μm.

10. The inductor according to claim 7, wherein the conductor further includes a fusion layer on a surface of the covering layer.

11. The inductor according to claim 10, wherein the fusion layer includes a thermoplastic resin or a thermosetting resin.

12. The inductor according to claim 10, wherein the fusion layer has a thickness of 1 μm and not more than about 3 μm.

* * * * *